(12) United States Patent
Amano

(10) Patent No.: US 6,278,912 B1
(45) Date of Patent: Aug. 21, 2001

(54) PITCH ANGLE CALCULATING DEVICE FOR VEHICLE

(75) Inventor: Nobuhiro Amano, Atsugi (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/241,312

(22) Filed: Feb. 1, 1999

(30) Foreign Application Priority Data

Feb. 2, 1998  (JP) ................................................. 10-021000

(51) Int. Cl.$^7$ ................................. G06F 7/00; G05D 1/00
(52) U.S. Cl. .................................. 701/1; 701/36; 701/49; 701/37; 315/82; 362/460; 280/5.507; 280/5.514; 280/6.157
(58) Field of Search .................................. 701/1, 36, 49, 701/37, 38; 315/82, 77, 363; 340/468, 457.2; 280/5.514, 5.507, 5.504, 5.503, 5.5, 6.157, 6.158, 612; 307/10.8; 362/465, 459, 460, 466, 37, 42

(56) References Cited

U.S. PATENT DOCUMENTS

| | | | |
|---|---|---|---|
| 4,483,546 | * 11/1984 | Brearley ............................. | 280/5.514 |
| 4,803,630 | * 2/1989 | Takizawa et al. ..................... | 701/39 |
| 4,965,878 | * 10/1990 | Yamagiwa et al. .................... | 701/37 |
| 5,180,024 | * 1/1993 | Eto ........................................ | 180/41 |
| 5,208,749 | * 5/1993 | Adachi et al. ......................... | 701/37 |
| 5,430,647 | * 7/1995 | Raad et al. ............................. | 701/38 |
| 5,652,703 | * 7/1997 | Kawazoe ................................ | 701/37 |
| 5,877,680 | * 3/1999 | Okuchi et al. ........................ | 340/468 |
| 5,923,125 | * 7/1999 | Endo ..................................... | 315/82 |
| 6,026,353 | * 2/2000 | Winner .................................. | 702/183 |

FOREIGN PATENT DOCUMENTS

| | | |
|---|---|---|
| 01109112 | 4/1989 | (EP) . |
| 01204811 | 8/1989 | (EP) . |
| 01247256 | 10/1989 | (EP) . |
| 05201222 | 8/1993 | (EP) . |
| 06127234 | 5/1994 | (EP) . |
| 06270630 | 9/1994 | (EP) . |
| 07186667 | 7/1995 | (EP) . |
| 07285311 | 10/1995 | (EP) . |
| 08332824 | 12/1996 | (EP) . |
| 0 803401 | 10/1997 | (EP) . |

\* cited by examiner

*Primary Examiner*—Jacques H. Louis-Jacques
(74) *Attorney, Agent, or Firm*—Foley & Lardner

(57) ABSTRACT

A pitch angle calculating device includes a height sensor 11 arranged in either one of a front position Pf and the rear position Pr separated from the front position Pf by a predetermined distance w, detecting either one of a front vehicle height hf and a rear vehicle height hr and a controller 7 calculating a pitch angle of the vehicle on the basis of the detected vehicle height hr, the predetermined distance w and a designated virtual height hfk established as the other vehicle height hr which is not detected by the height sensor 11. The designated virtual height hfk is corrected into a corrected height (hfk+α) by both number and positions of passengers on the vehicle and both weight and position of loads on the vehicle in advance of calculating the pitch angle by the controller 7. If only providing the height sensor 11 in either one of the front position Pf and the rear position Pr against changes in number and position of passengers or weight and position of loads on the vehicle, it is possible to calculate the accurate pitch angle, so that the manufacturing cost of the device can be reduced.

15 Claims, 11 Drawing Sheets

PITCH ANGLE CALCULATING DEVICE FOR VEHICLE

BACKGROUND OF THE INVENTION

1. Field of the Invention

The present invention relates to a device for calculating a pitch angle for a vehicle.

2. Description of the Invention

In general, the pitch angle θ for a vehicle is calculated by the following expression:

$$\theta = \tan^{-1} \frac{hf - hr}{w} \quad (1)$$

wherein hf is a vehicle height at a front wheel, hr is a vehicle height at a rear wheel, and w is a wheel base length.

It is noted that, in the above expression, height variations from initial heights of the vehicle under its initial condition are entered into the vehicle heights hf, hr, respectively. Accordingly, the pitch angle θ of the vehicle under the initial condition is equal to an angle of zero (0) degree.

As sensors for detecting the heights hf, hr at the front and rear wheels, a vehicle height sensor which detects an angle of a suspension arm of each wheel and converts the angle to the vehicle height is put into practical use. However, in a vehicle having a complicated suspension structure, such as a four-wheel drive vehicle, there exists a problem of difficulty to install the vehicle height sensor in the vehicle.

SUMMARY OF THE INVENTION

It is therefore an object of the present invention to provide a pitch angle calculating device which is capable of calculating an accurate pitch angle of the vehicle by either one of the front vehicle height and the rear vehicle height.

To achieve the above-mentioned object of the present invention, from the first aspect of the present invention, there is provided a pitch angle calculating device for a vehicle, comprising:

a height detecting unit arranged in either one of a front position (Pf) of the vehicle and the rear position (Pr) separated from the front position (Pf) by a predetermined distance (w), detecting either one of a front vehicle height and a rear vehicle height; and a calculating section calculating a pitch angle of the vehicle on the basis of the detected vehicle height, the predetermined distance (w) and a designated virtual height established as the other vehicle height which is not detected by the height detecting unit;

wherein the designated virtual height is corrected with both number and positions of passengers on the vehicle and both weight and position of loads on the vehicle in advance of calculating the pitch angle by the calculating section.

From the second aspect of the present invention, there is provided a pitch angle calculating device for a vehicle, comprising:

a height detecting unit arranged in a rear position (Pr) of the vehicle, detecting a rear vehicle height (hr) of the vehicle, the rear position (Pr) being separated from a front position (Pf) of the vehicle by a predetermined distance (w);

a calculating section calculating a pitch angle of the vehicle on the basis of the detected rear vehicle height (hr), the predetermined distance (w) and a designated virtual height (hfk) established as the front vehicle height (hf) which is not detected by the height detecting unit; and a vehicle speed detecting unit detecting a vehicle speed of the vehicle;

wherein the designated virtual height (hfk) is corrected by the detected vehicle speed in advance of calculating the pitch angle by the calculating section.

From the third aspect of the present invention, there is provided a pitch angle calculating device for a vehicle, comprising:

a height detecting unit arranged in a rear position (Pr) of the vehicle, detecting a rear vehicle height (hr) of the vehicle, the rear position (Pr) being separated from a front position (Pf) of the vehicle by a predetermined distance (w);

a calculating section calculating a pitch angle of the vehicle on the basis of the detected rear vehicle height (hr), the predetermined distance (w) and a designated virtual height (hfk) established as the front vehicle height (hf) which is not detected by the height detecting unit; and an acceleration detecting unit detecting an acceleration of the vehicle in forward and backward directions thereof;

wherein the designated virtual height (hfk) is corrected by the detected acceleration in advance of calculating the pitch angle by the calculating section.

From the fourth aspect of the present invention, there is provided a pitch angle calculating device for a vehicle, comprising:

a height detecting unit arranged in a rear position (Pr) of the vehicle, detecting a rear vehicle height (hr) of the vehicle, the rear position (Pr) being separated from a front position (Pf) of the vehicle by a predetermined distance (w);

a calculating section calculating a pitch angle of the vehicle on the basis of the detected rear vehicle height (hr), the predetermined distance (w) and a designated virtual height (hfk) established as the front vehicle height (hf) which is not detected by the height detecting unit; and a road condition detecting unit detecting a road condition of a road on which the vehicle is being traveled;

wherein the designated virtual height (hfk) is corrected with the detected road condition in advance of calculating the pitch angle by the calculating section.

The above and other features and advantages of this invention will become apparent, and the invention itself will best be understood, from a study of the following description and appended claims, with reference to the detached drawings showing some preferred embodiments of the invention.

DESCRIPTION OF THE PREFERRED EMBODIMENT

We will describe embodiments in which the present invention is applied to an automatic headlamp leveling apparatus, which is commonly called "headlamp auto-levelizer". Nevertheless, the present invention is applicable to not only headlamp auto-levelizer but all of the apparatus that executes the control based on the pitch angle.

1ST. EMBODIMENT OF THE INVENTION

We now describe the first embodiment where the vehicle height $hr$ at the rear wheel position of the vehicle is detected to calculate the pitch angle θ for controlling the optical axes of the headlamps.

Figure 1:
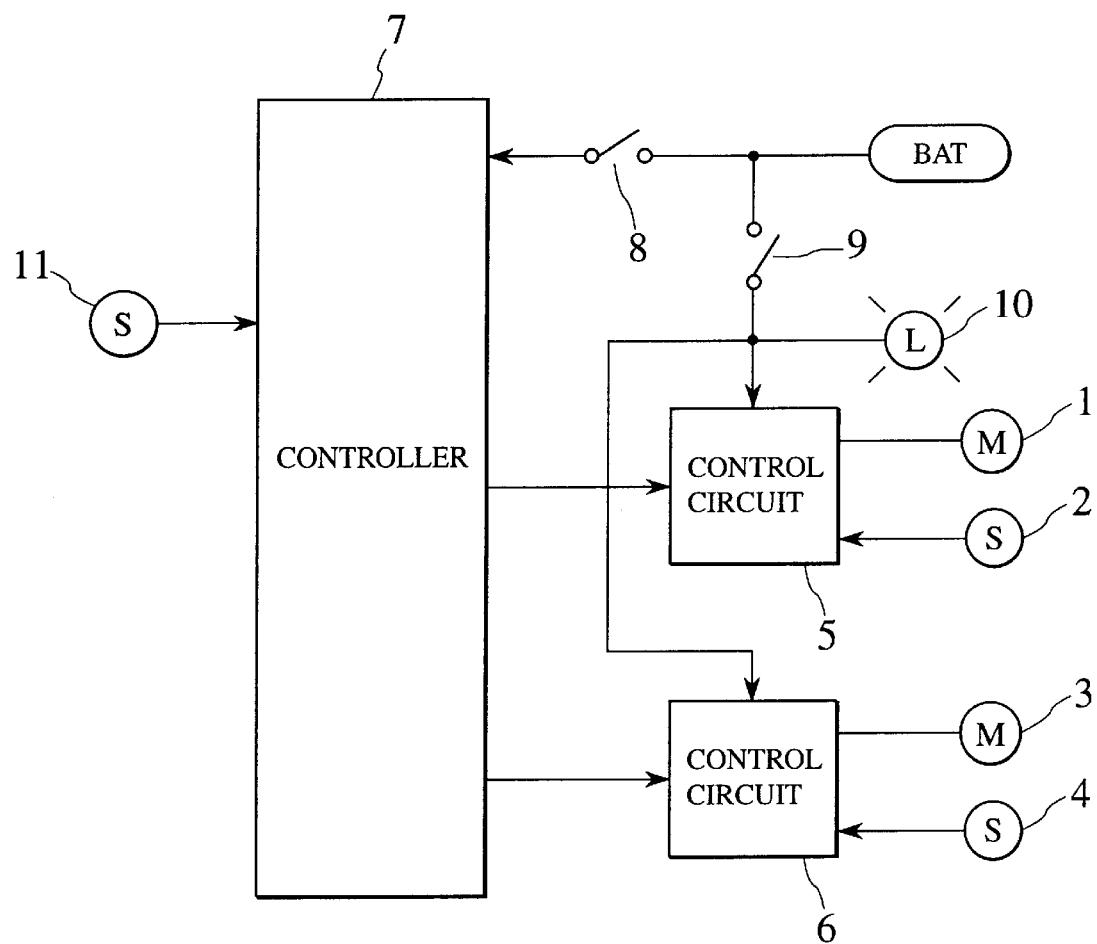
FIG. 1 is a diagram showing a constitution of a pitch angle calculating device in accordance with a first embodiment of the present invention.

FIG. 1 shows a constitution of the headlamp auto-levelizer in accordance with an embodiment of the invention.

In FIG. 1, reference numeral 1 designates a motor which rises and falls an optical axis of a right headlamp (not shown). A position sensor 2 is provided for detecting a position of the optical axis of the right headlamp. Similarly, reference numeral 3 designates a motor which rises and falls an optical axis of a left headlamp (also not shown). A position sensor 4 is provided for detecting a position of the optical axis of the left headlamp. Note, any type of headlamp, for example, a shield-type headlamp, a semi-shield type headlamp or the like will do as the headlamp of the invention. Further, as to the detailed method of adjusting the optical axis of the headlanmp, a reflector for the head-lamp may be tilted. Alternatively, a headlamp assembly may be tilted. In order to control the optical axis of the right headlamp, a control circuit 5 controls the drive of the motor 1 on the basis of an "optical axis position" command signal outputted from a controller 7 and an "optical axis position" feedback signal outputted from the position sensor 2. In order to control the optical axis of the left headlamp, a control circuit 6 controls the drive of the motor 3 on the basis of an "optical axis position" command signal outputted from a controller 7 and an "optical axis position" feedback signal outputted from the position sensor 4.

When an ignition key is turned to its ON position, then an ignition switch 8 closes to supply a battery power source BAT to the controller 7. Further, at a first stage of a light switch (not-shown), a small lamp switch 9 is closed to light a small lamp (expressing a vehicle width) 10 and supply the battery power source BAT. A height sensor 11 is attached to a suspension arm of the rear wheel on the right side (right and rear wheel), for detecting the angle of the suspension arm thereby to detect the vehicle height $hr$ at the right and rear wheel.

The controller 7 is composed of a micro-computer and its peripheral components and carries out a calculation of the pitch angle θ to determine the positions of the optical axes of the right and left headlamps. Then, the controller 7 also outputs an optical axis command signal for the right headlamp to the control circuit 5 and an optical axis command signal for the left headlamp to the control circuit 6.

Figure 2:
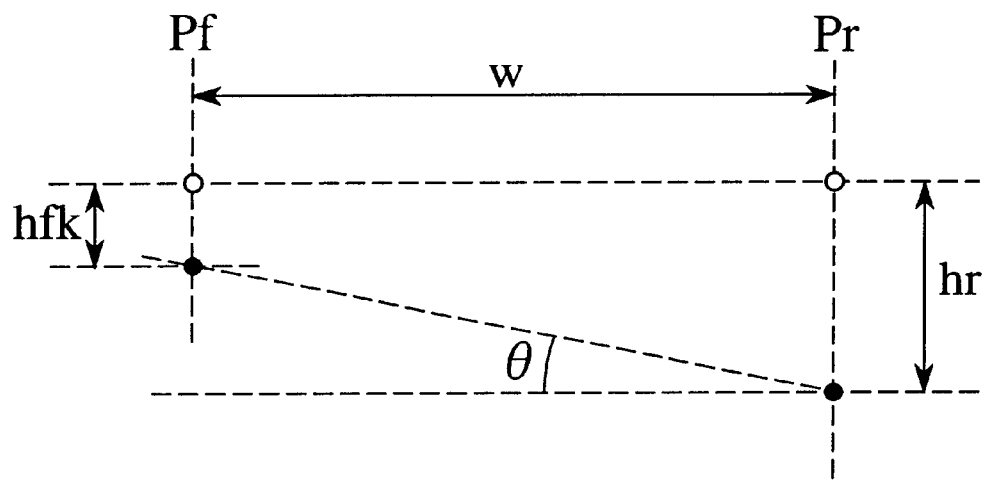
FIG. 2 is a diagram illustrating a relationship among respective reference positions for front and rear wheel positions, their detected positions and heights.

FIG. 2 shows a relationship among respective reference positions at the front wheel position $Pf$ and the rear wheel position $Pr$, a detected position and the vehicle front and rear heights. In the figure, respective white points at the front wheel position $Pf$ and the rear wheel position $Pr$ designate positions of reference vehicle heights in the reference condition of the vehicle. As mentioned above, when the vehicle is in the reference condition (e.g. unloaded condition), the pitch angle θ becomes to be zero. When the vehicle heights at the front wheel position and the rear wheel position change corresponding to the number and position of the passengers and the weight and position of loads, then the pitch angle corresponding to the changes is produced. A black point at the rear wheel position $Pr$ designates the detected position and therefore, a distance between the detected position and the reference position corresponds to a change from the reference position, that is, the vehicle height $hr$ at the rear wheel position $Pr$. Note, another black point at the front wheel position $Pf$ designates a virtual or imaginary detected position ($hfk$).

In this specification, a change in the direction from the reference position to a lowered position is defined as a positive change, while a change in the direction from the reference position to a heightened position is defined as a negative change. Therefore, when the front side of the vehicle sinks or the rear side of the vehicle rises, then the positive pitch angle θ is obtained. On the contrary, when the front side of the vehicle rises or the rear side of the vehicle sinks, then the negative pitch angle θ is obtained.

According to the first embodiment, the height sensor 11 is arranged in the rear wheel position $Pr$ only and not provided in the front wheel position $Pf$. The virtual height $hfk$ is employed as a vehicle height in the front wheel position Pf. That is, on establishment of an imaginary detected position in the front wheel position $Pf$ (indicated by black point in FIG. 2), a distance between the virtual detected position and the reference position is expressed by the virtual height $hfk$. Thus, the pitch angle θ is represented by the following expression (2).

$$\theta = \tan^{-1}\frac{hfk - hr}{w} \qquad (2)$$

Figure 3:
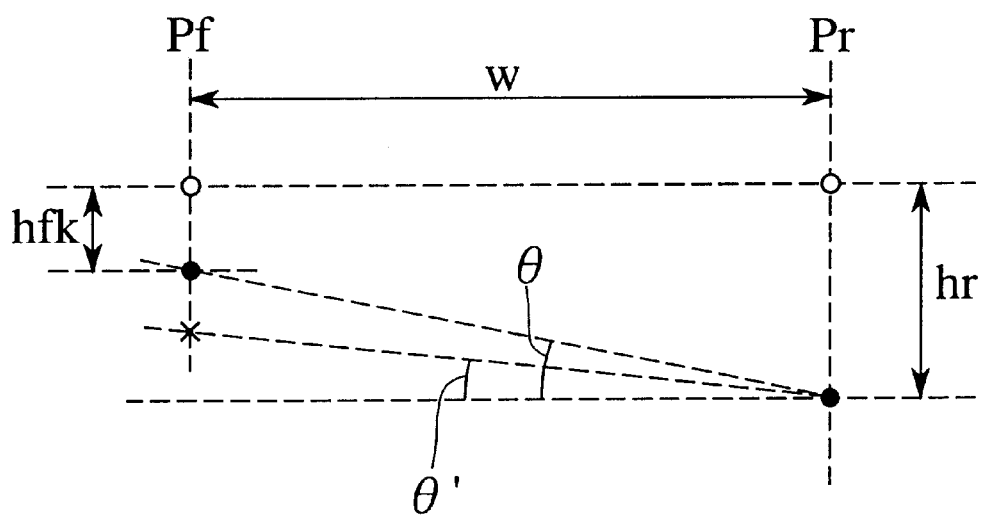
FIG. 3 is a diagram for explanation of an example of an actual vehicle height getting larger than a virtual vehicle height value at the front wheel due to the number and position of passengers and the weight and position of loads.

Depending on the number and position of the passengers and the weight and position of load on the vehicle, however, there is a case that, as shown in FIG. 3, an actual front position (indicated by a mark "X" at the front wheel position Pf is positioned lower than the previously established position (indicated by the black point at the front wheel position Pf), so that the actual height becomes larger than the virtual height hfk. In such a case, a true pitch angle θ' gets smaller than the pitch angle θ on calculation. If the optical axes of the headlamps are adjusted under such a situation, the optical axes will be over-lowered thereby to shorten a forward irradiation distance of the headlamps.

Figure 4:
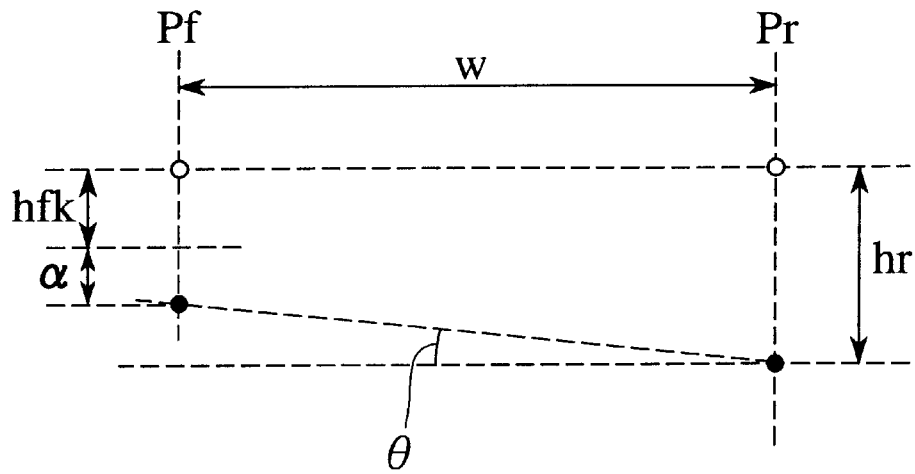
FIG. 4 is a diagram showing a method of calculating the pitch angle by previously compensating the virtual vehicle height value at the front wheel.

According to the first embodiment, as shown in FIG. 4, the virtual detected position at the front wheel position Pf is previously corrected to the lower side by a predetermined value α and it is executed to calculate the pitch angle on the basis of a distance between the corrected virtual position (indicated by the black point at the front wheel position Pf of FIG. 4) and the reference position, i.e., the virtual height after correction (hfk+α) at the front wheel position Pf, by the following expression (3).

$$\theta = \tan^{-1}\frac{(hfk + \alpha) - hr}{2} \qquad (3)$$

By determining the positions of optical axes of the headlamps corresponding to the detected rear height hr at the rear wheel position and the previously corrected virtual height (hfk+α) at the front wheel position and sequentially executing to control the optical axes, it is possible to calculate the accurate pitch angle even when the vehicle height at the front wheel position is lowered due to the changes in the number and position of the passengers and the weight and position of loads on the vehicle, whereby the proper irradiation distance and area of the headlamps can be ensured.

Figure 5:
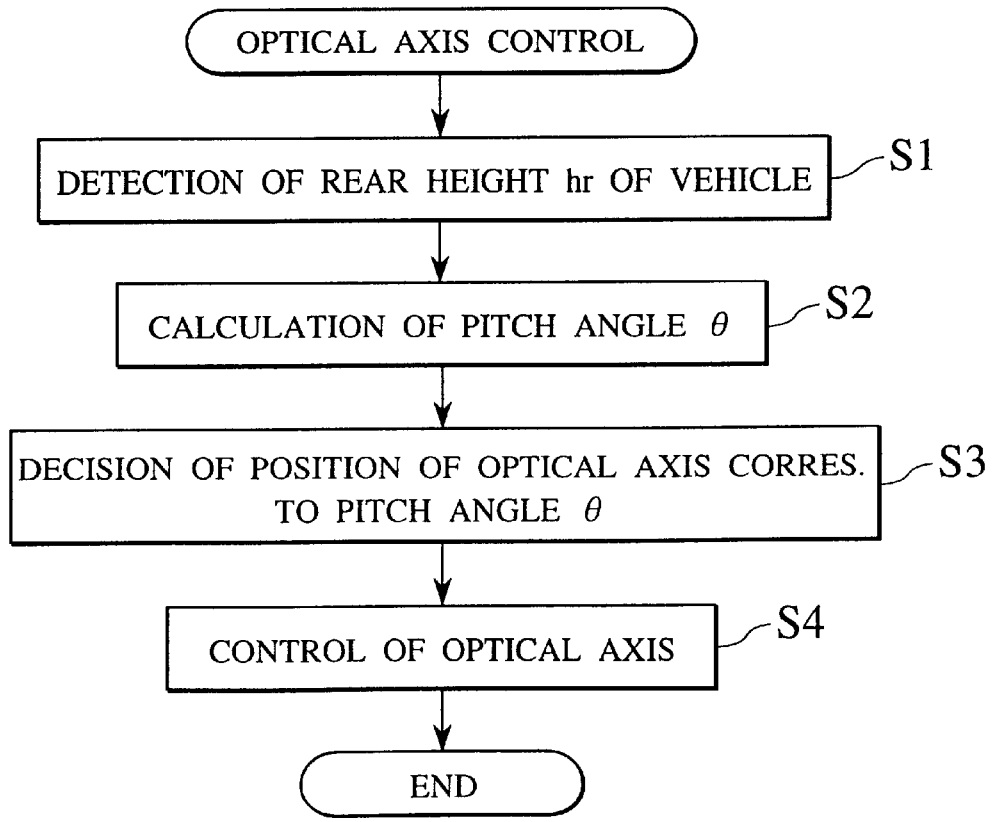
FIG. 5 is a flow chart showing an optical axis control program in accordance with the first embodiment.

FIG. 5 is a flow chart showing the optical axis control of the embodiment. With reference to this flow chart, we now describe an operation of the device in accordance with the embodiment.

At step S1, it is executed to detect the vehicle height hr at the rear wheel position by the vehicle height sensor 11. Next, at step S2, it is executed to calculate the pitch angle θ by the expression (3) on the basis of the vehicle height hr at the rear wheel position and the previously compensated virtual height (hfk+α) at the front wheel position. At step S3, it is executed to determine the positions of the optical axes corresponding to the calculated pitch angle θ and finally, the routine goes to step S4 where the optical axes of the headlamps are controlled by the control circuits 5, 6.

MODIFICATION OF THE 1ST. EMBODIMENT

According to the modification, the height sensors 11 are provided on right and left points of the rear wheel position E and the controller 7 does calculate the pitch angle θ on the basis of an average h of the right and left heights detected by the height sensors 11, the previously corrected height (hfk+α) and the distance (w).

Providing that right and left heights detected by the height sensors 11 on both sides of the vehicle are expressed by hRR and hRL respectively, the average hRa is obtained by the following expression.

$$hRa = (hRR + hRL)/2 \qquad (4)$$

Figure 6:
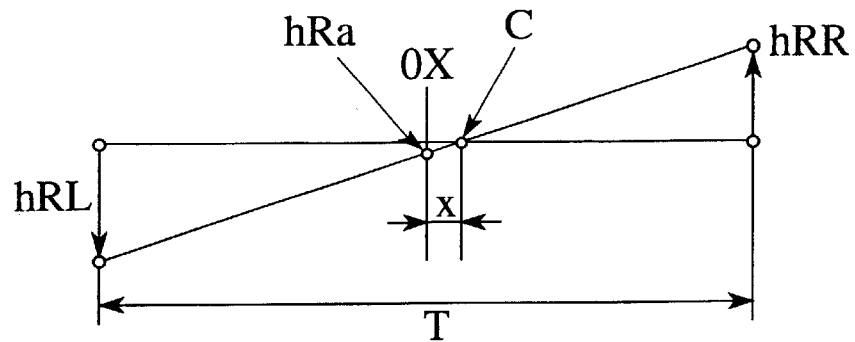
FIG. 6 is a diagram illustrating a relationship among a center of a tread, a roll center and right and left vehicle heights at the vehicle's rolling.

Hereat, as shown in FIG. 6, a roll center C at the vehicle's rolling is somewhat deviated from the middle point of the left and right wheels, i.e. the center OX of a tread T. FIG. 6 shows a positional relationship among the heights hRR, hRL at the left and right rear wheel positions, the center OX of the tread T and the roll center C when the vehicle is turning to the right. It is obvious from the figure that, strictly mentioning, when the vehicle is rolling, it is necessary to calculate a height hRC at the roll center C, which is not a height of the center OX of the tread T, i.e. the average hRa of the right height hRR and the left height hRL.

$$hRC = hRR - \frac{\frac{T}{2} - x}{T} \times (hRR - hRL) \qquad (5)$$

In the above expression (5), an alphabet T designates the tread, while an alphabet x designates a distance between the center OX of the tread T and the roll center C. Accordingly, if the distance x between the center OX of the tread T and the roll center C can be detected, then it is possible to detect the vehicle height hRC at the accurate roll center C.

Nevertheless, since the roll center C displaces due to the vehicle's behavior, it is difficult to detect or calculate the position of the roll center C. However, it can be thought that a relationship of (x≪T) is established since the roll center C is actually close to the center OX of the tread T. Then, the expression (5) can be modified as follow.

$$hRC = \frac{hRR + hRL}{2} + \frac{x}{T}(hRR - hRL) \qquad (6)$$

As the second member in the right part of the above equation can be neglected because of its extreme smallness, the equation (6) is further modified to an approximate equation hRC≈hRa.

Thus, by calculating the average hRa of the heights hRR and hRL by the expression (4), it is possible to obtain an accurate vehicle height at the rear wheel position, which is not influenced by the vehicle's rolling. Then, the expression (3) in case of employing the average hRa will be as follows.

$$\theta = \tan^{-1}\frac{(hfk + \alpha) - hRa}{w} \qquad (7)$$

As mentioned above, the pitch angle calculating device in accordance with the above-mentioned modification is adapted so as to calculate the pitch angle on the basis of the average of the right and left heights, the virtual height and the above distance. Thus, even if the vehicle is rolled, it is possible to detect the accurate pitch angle by a small number of height detecting sensors.

2ND. EMBODIMENT OF THE INVENTION

Although the above-mentioned first embodiment is related to the arrangement where the height sensor(s) is arranged only in the rear wheel position, we now describe the second embodiment where the height sensor is arranged only in the rear wheel position. Note, the constitution of the device in accordance with the second embodiment only differs from that of the first embodiment in respect that the height sensor 11 of FIG. 1 does detect the height hf at the front wheel position Pf and therefore, the descriptions of the constitution are deleted.

Figure 7:
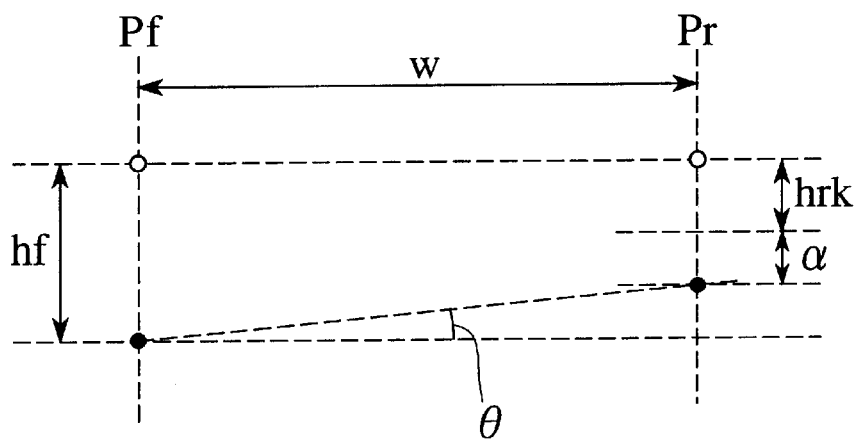
FIG. 7 is a diagram showing a method of calculating the pitch angle by previously compensating the virtual vehicle height value at the rear wheel.

According to the second embodiment, as shown in FIG. 7, the virtual detected position at the rear wheel position Pr is previously corrected to the lowed side by a predetermined value α and it is executed to calculate the pitch angle on the basis of a distance between the corrected virtual position (indicated by the black point at the rear wheel position Pr of FIG. 7) and the reference position, i.e. the virtual height after correction (hrk+α) at the rear wheel position Pr, by the following expression (8).

$$\theta = \tan^{-1} \frac{hf - (hrk + \alpha)}{w} \quad (8)$$

Note, since the optical axis control in accordance with the second embodiment differs from that of the first embodiment shown in FIG. 5 only in respect of the position of the vehicle height to be detected, the descriptions of the operation will be eliminated.

By determining the positions of optical axes of the headlamps corresponding to the detected front height hf at the front wheel position and the previously corrected virtual height (hrk+α) at the rear wheel position and sequentially executing to control the optical axes, it is possible to calculate the accurate pitch angle even when the vehicle height at the rear wheel position is lowered due to the changes in the number and position of the passengers and the weight and position of loads on the vehicle, whereby the proper irradiation distance and area of the headlamps can be ensured.

Note, as similar to the aforementioned modification of the first embodiment, the height sensors 11 may be provided on left and right sides of the vehicle to obtain the average of the left and right heights in one modification of the second embodiment. According to the modification, it is possible to obtain the accurate vehicle height at the rear wheel position, which is not influenced by the vehicle's rolling.

3RD. EMBODIMENT OF THE INVENTION

Figure 8:
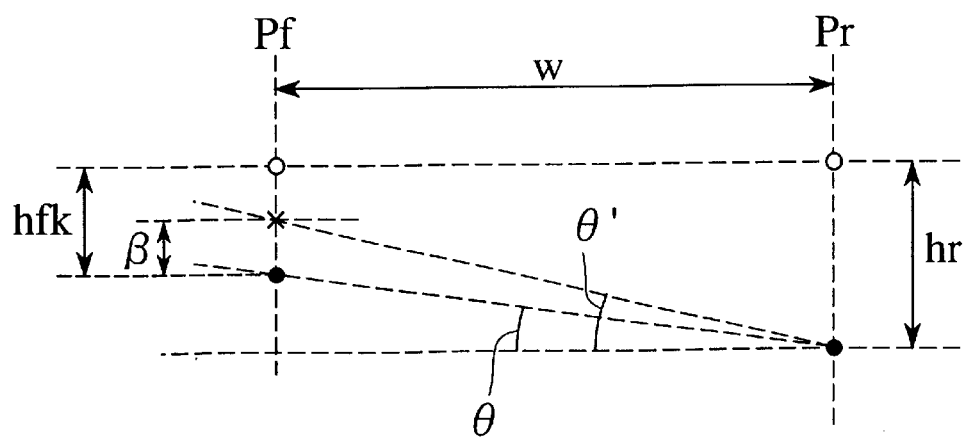
FIG. 8 is a diagram showing a method of calculating the pitch angle by compensating a lift-up of the front side of the vehicle at the vehicle's traveling at high speed.

It is general that the front side of the vehicle is raised at the vehicle's traveling at high speed. As shown in FIG. 8, when calculating the pitch angle θ by arranging the height sensor only at the rear wheel position to detect the vehicle height hr on establishment of the virtual value hfk as the height of the front wheel position, the vehicle height (indicated by the mark "X") at the front wheel position gets higher than the virtual value (indicated by the black point) at the vehicle's traveling at high speed. In such a case, an actual pitch angle θ' does increase in comparison with the pitch angle θ calculated on the basis of the virtual value hfk, so that the headlamps are shifted into "upward glance" condition thereby to dazzle the oncoming and preceding vehicles.

According to the third embodiment, the virtual height value hfk at the front wheel position Pf is corrected to the higher side by a predetermined value β in advance and thereupon, it is executed to calculate the pitch angle θ by the following expression.

$$\theta = \tan^{-1} \frac{(hfk - \beta) - hr}{w} \quad (9)$$

In case of correcting the virtual height value hfk at the front wheel position Pf to the lower side by the predetermined value α corresponding to the number and position of the passengers and the weight and position of loads on the vehicle, it is executed to further correct the virtual height value hfk to the higher side by the predetermined value β in advance and sequentially calculate the pitch angle θ by the following expression.

$$\theta = \tan^{-1} \frac{(hfk + \alpha - \beta) - hr}{w} \quad (10)$$

Figure 9:
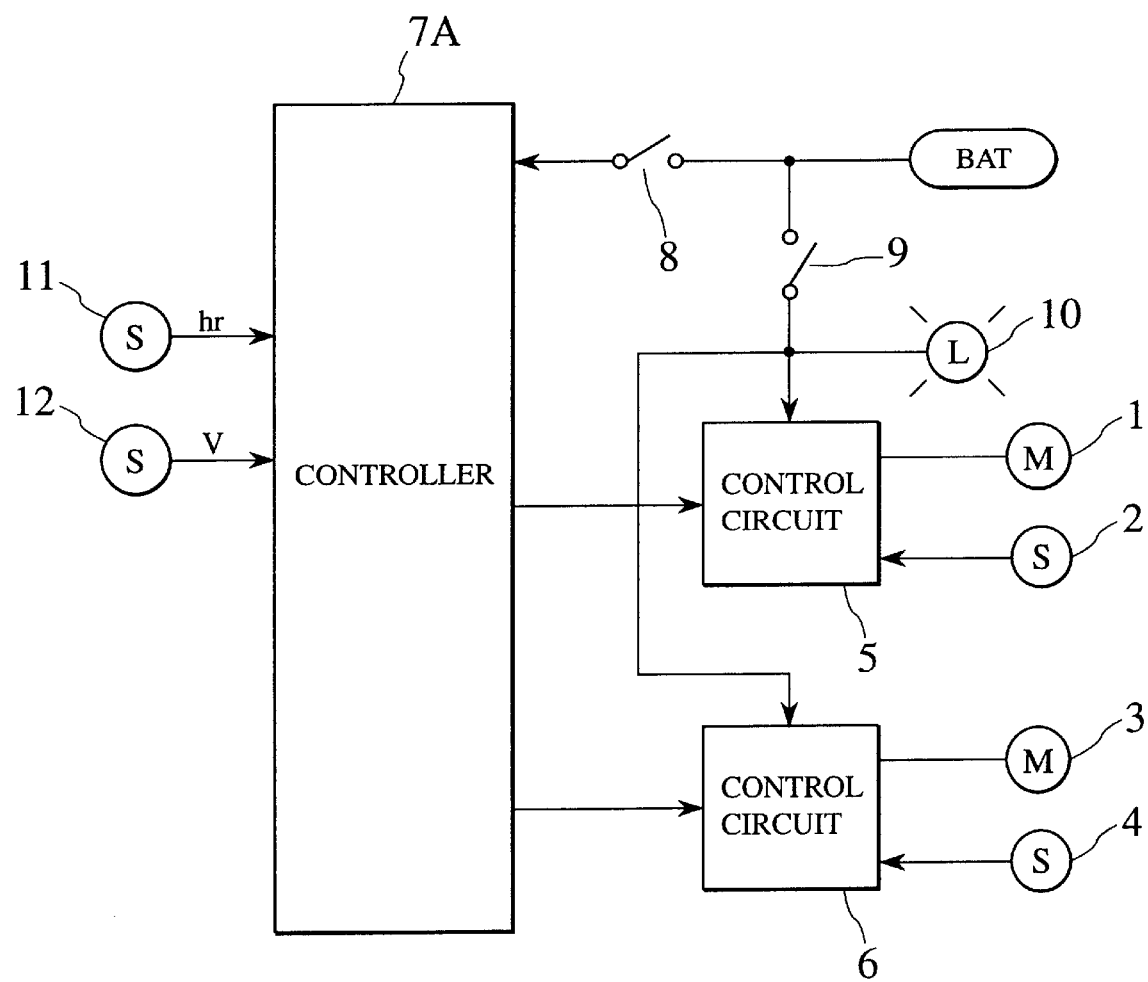
FIG. 9 is a diagram showing a constitution of a pitch angle calculating device in accordance with a third embodiment of the present invention.

FIG. 9 shows the constitution of the device in accordance with the third embodiment. Note, elements similar to those shown in FIG. 1 are indicated by the same reference numerals respectively and therefore, their descriptions are eliminated.

A vehicle speed sensor 12 detects a traveling speed V of the vehicle. A controller 7A serves to calculate the pitch angle θ on the basis of the height hr at the rear wheel position Pr, which is detected by the height sensor 11, and the virtual value hfk at the front wheel position Pf, by the expression (2) or (3). However, when the speed V exceeds a designated value Vk, the pitch angle θ is calculated on correction of a "lift-up" amount of the raised front side at the vehicle's traveling at high speed, by the expression (9) or (10).

Figure 10:
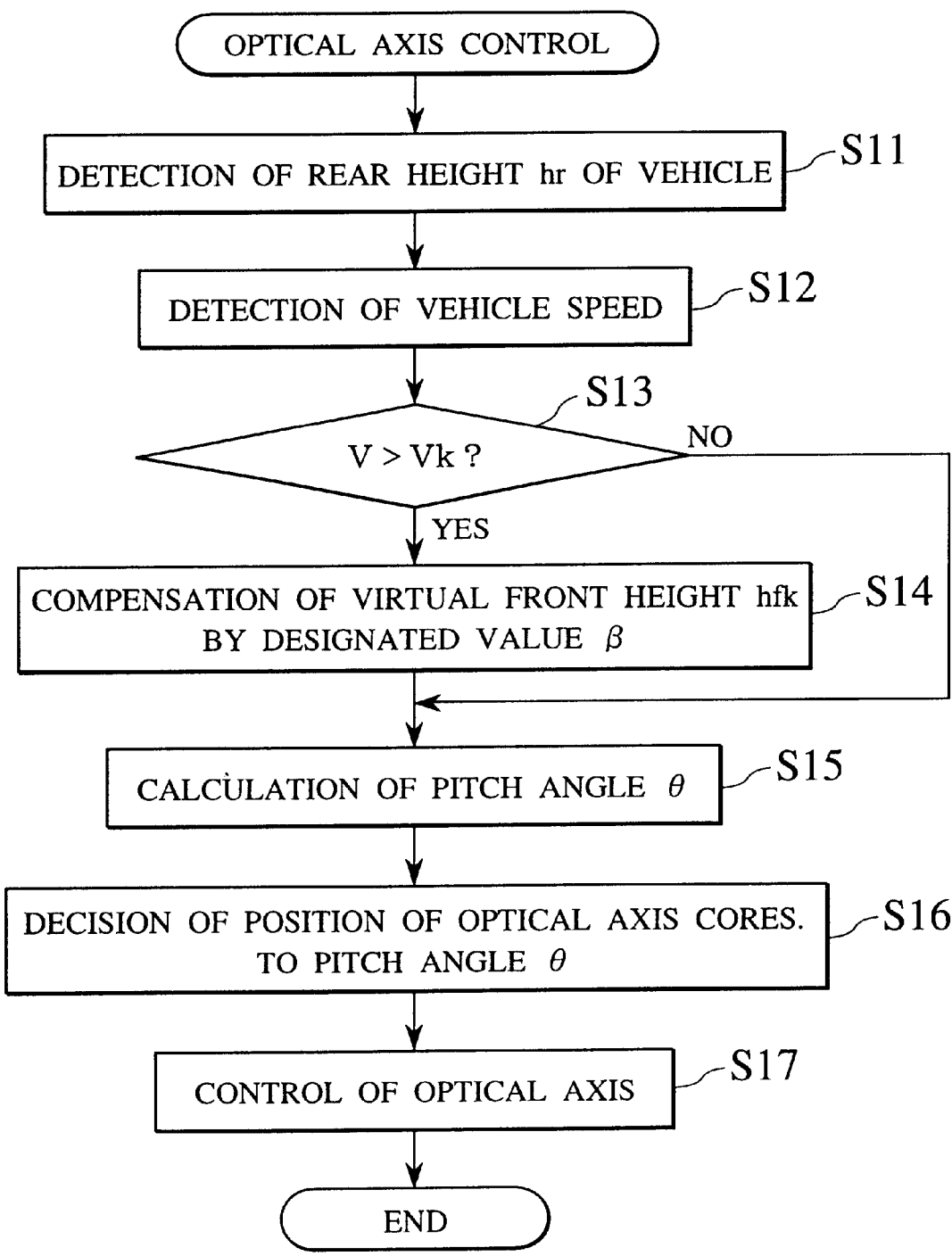
FIG. 10 is a flow chart showing an optical axis control program in accordance with the third embodiment.

FIG. 10 is a flow chart showing the optical axis control of the embodiment.

With reference to this flow chart, we now describe an operation of the device in accordance with the third embodiment.

At step S11, it is executed to detect the vehicle height hr at the rear wheel position Pr by the vehicle height sensor 11. Next, at step S12, it is further executed to detect the vehicle speed V by the vehicle speed sensor 12. At step S13, it is judged whether the speed V does exceed the designated value Vk. When the speed V exceeds the designated value Vk since the vehicle travels at high speed, the routine goes to step S14 where the virtual height hfk at the front wheel position Pf is corrected to the higher side by the predetermined value β. At sequent step S15, it is executed to calculate the pitch angle θ. That is, when the vehicle travels at high speed, it is executed to calculate the pitch angle θ by the expression (5) or (6). On the contrary, when the vehicle does not travel at high speed, it is executed to calculate the pitch angle θ by the expression (2) or (3). At next step S16, it is executed to determine the position of the optical axes corresponding to the calculated pitch angle θ. At step S17, the optical axes of the headlamps are controlled by the control circuits 5, 6.

MODIFICATION OF THE 3RD. EMBODIMENT OF THE INVENTION

As mentioned above, the third embodiment is related to the method of correcting the virtual height hfk at the front wheel position Pf to the higher side by the predetermined value β when the vehicle speed V exceeds the designated value Vk. Now, since the lift-up amount of the front side at the vehicle's traveling at high speed is proportional to the speed V, the predetermined value β may be increased in proportion to the vehicle speed V. Note, the constitution of the device in accordance with this modification is identical to that shown in FIG. 9 and therefore, the descriptions of the constitution are deleted.

Figure 11:
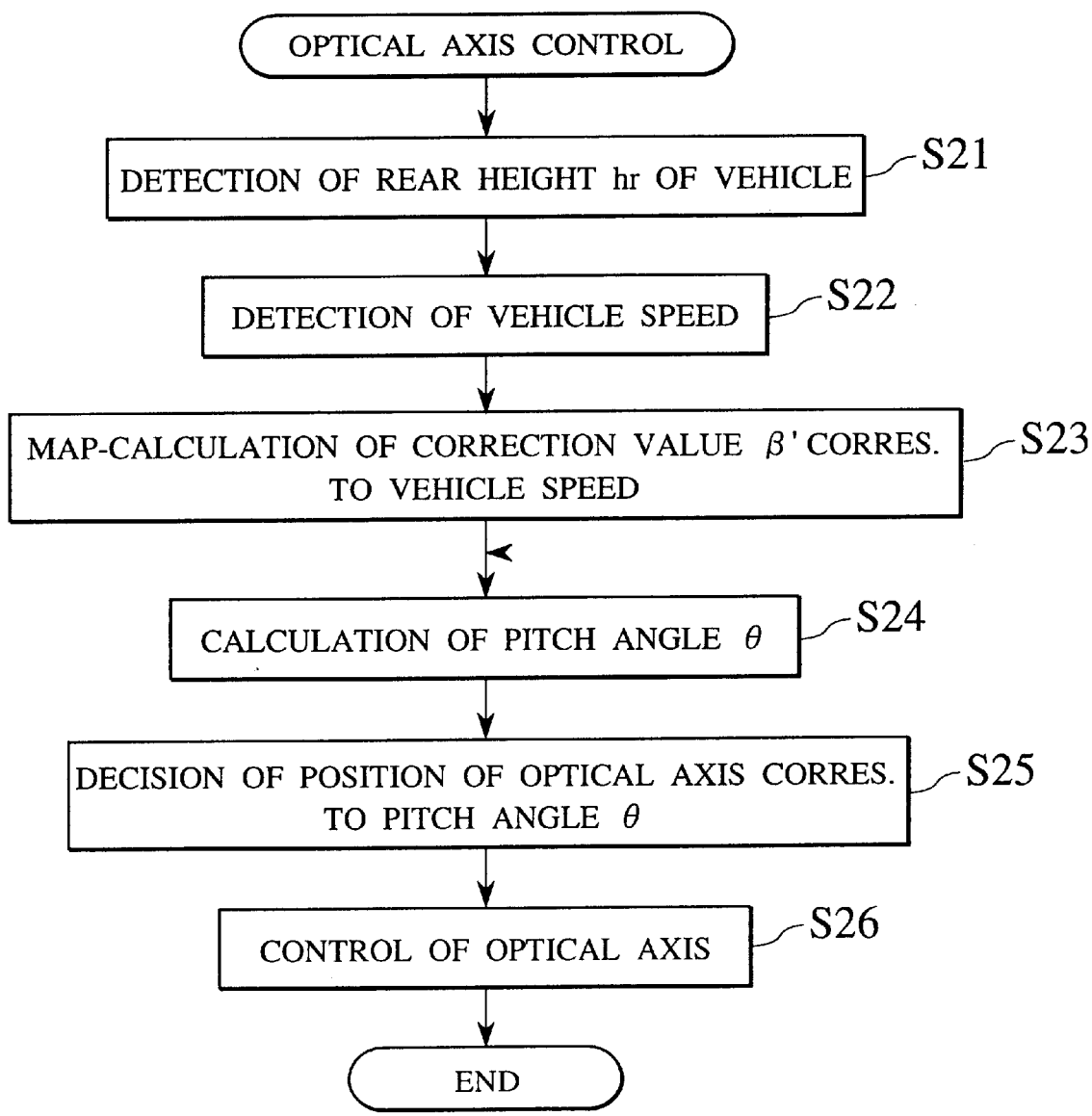
FIG. 11 is a flow chart showing an optical axis control program in accordance with a modification of the third embodiment.

FIG. 11 is a flow chart showing the optical axis control of the above modification.

At step S21, it is executed to detect the vehicle height hr at the rear wheel position Pr by the vehicle height sensor 11. Next, at step S22, it is further executed to detect the vehicle speed $V$ by the vehicle speed sensor 12. At step S23, it is executed to calculate the corrected value β' corresponding to the vehicle speed V, on the map of corrected values β'. The map of corrected values β' can be provided by previously measuring increments of the vehicle height at the front wheel position $Pf$ relative to the vehicle speed $V$ and sequentially storing them as the corrected values β'. At step S24, the pitch angle θ is calculated by the following expression (11) or (12).

$$\theta = \tan^{-1}\frac{(hfk - \beta') - hr}{w} \quad (11)$$

$$\theta = \tan^{-1}\frac{(hfk + \alpha - \beta') - hr}{w} \quad (12)$$

At sequent step S25, it is executed to determine the position of the optical axes corresponding to the calculated pitch angle θ. At step S26, the optical axes of the headlamps are controlled by the control circuits 5, 6.

Note, in common with the third embodiment and the aforementioned modification, the height sensors 11 may be provided on left and right sides of the vehicle to obtain the average of the left and right heights, as similar to the first embodiment. According to this modification, it is possible to obtain the accurate vehicle height at the rear wheel position, which is not influenced by the vehicle's rolling.

4TH. EMBODIMENT OF THE INVENTION

It should be noted that the front side of the vehicle is raised at the vehicle's accelerating, too. When calculating the pitch angle by arranging the height sensor only at the rear wheel position to detect the vehicle height $hr$ on establishment of the virtual value $hfk$ as the height of the front wheel position, the vehicle height at the front wheel position gets higher than the virtual value at the vehicle's accelerating. In such a case, an actual pitch angle θ' does increase in comparison with the pitch angle calculated on the basis of the virtual value $hfk$, so that the headlamps are shifted into "upward glance" condition thereby to dazzle the oncoming and preceding vehicles. According to the fourth embodiment, since the vehicle height at the front wheel position at the vehicle's accelerating is raised in proportion to the acceleration of the vehicle, the virtual height $hfk$ at the front wheel position $Pf$ is corrected to the higher side by a predetermined value $a$ corresponding to the acceleration and sequentially, the pitch angle θ is calculated.

Figure 12:
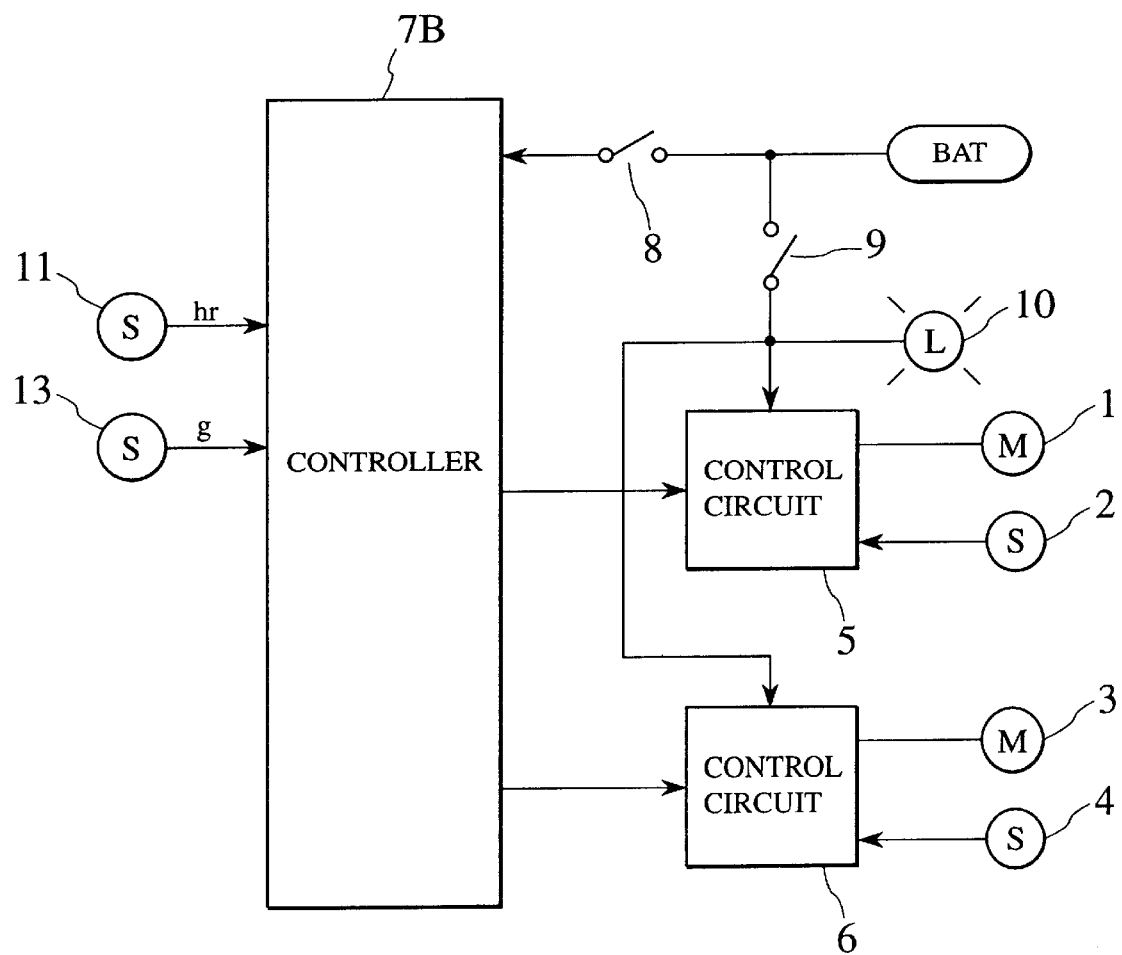
FIG. 12 is a diagram showing a constitution of a pitch angle calculating device in accordance with a fourth embodiment of the present invention.

FIG. 12 shows the constitution of the device in accordance with the fourth embodiment. Note, elements similar to those shown in FIG. 1 are indicated by the same reference numerals respectively and therefore, their descriptions are eliminated.

An acceleration sensor 13 detects the acceleration g of the vehicle in the forward and backward directions. A controller 7B serves to correct the virtual height value $hfk$ at the front wheel position $Pf$, by the correction value a corresponding to the acceleration g and sequentially calculate the pitch angle θ on the basis of the corrected virtual value (hfka) and the vehicle height $hr$ at the rear wheel position $Pr$, by the following expression (13) or (14).

$$\theta = \tan^{-1}\frac{(hfk - a) - hr}{w} \quad (13)$$

-continued $$\theta = \tan^{-1}\frac{(hfk + \alpha - a) - hr}{w} \quad (14)$$

Figure 13:
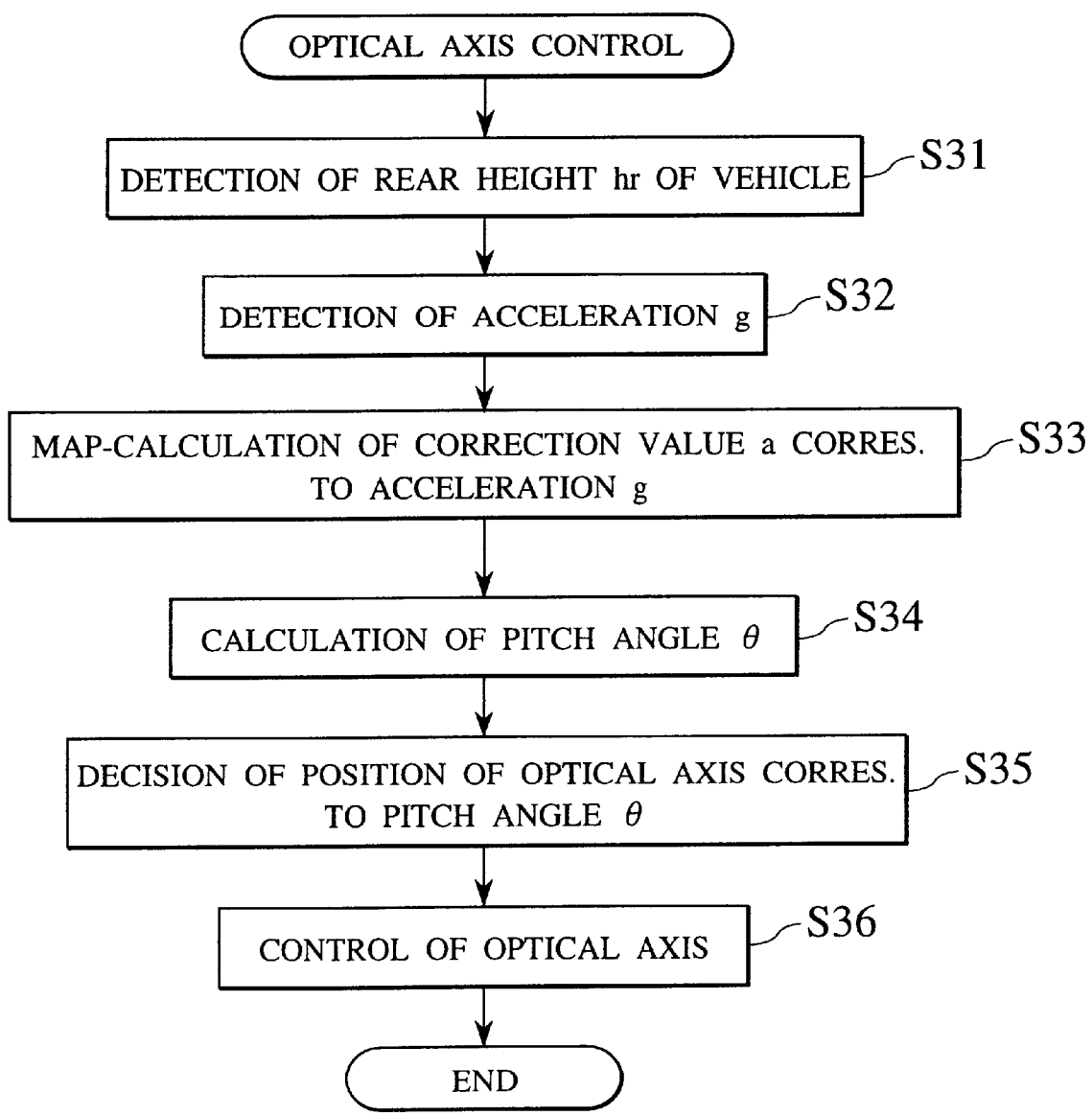
FIG. 13 is a flow chart showing an optical axis control program in accordance with the fourth embodiment.

FIG. 13 is a flow chart showing the optical axis control of the fourth embodiment. With reference to this flow chart, we now describe an operation of the device in accordance with the fourth embodiment.

At step S31, it is executed to detect the vehicle height $hr$ at the rear wheel position $Pr$ by the vehicle height sensor 11. Next, at step S32, it is further executed to detect the acceleration g by the acceleration sensor 13. At step S33, it is executed to calculate the corrected value $a$ corresponding to the acceleration g, on the map of corrected values $a$. The map of corrected values $a$ can be provided by previously measuring increments of the vehicle height at the front wheel position $Pf$ relative to the acceleration g and sequentially storing them as the correction values $a$. At step S34, the pitch angle θ is calculated by the above expression (13) or (14). At next step S35, it is executed to determine the position of the optical axes corresponding to the calculated pitch angle θ. At step S36, the optical axes of the headlamps are controlled by the control circuits 5, 6.

Note, in place of the provision of the acceleration sensor 13, the acceleration g may be obtained by differentiating the vehicle speed V detected by the vehicle speed sensor 12 in the modification.

Additionally, in common with the fourth embodiment and the above modification, the height sensors 11 may be provided on left and right sides of the vehicle to obtain the average of the left and right heights, as similar to the first embodiment. According to the further modification, it is possible to obtain the accurate vehicle height at the rear wheel position, which is not influenced by the vehicle's rolling.

5TH. EMBODIMENT OF THE INVENTION

When the frictional resistance to the road is large, the front side of the vehicle is raised corresponding to the degree of traction. In case of calculating the pitch angle by arranging the height sensor only at the rear wheel position to detect the vehicle height hr on establishment of the virtual value $hfk$ as the height of the front wheel position, the vehicle height at the front wheel position gets higher than the virtual value $hfk$ when the frictional resistance to the road is large. In such a case, an actual pitch angle does increase in comparison with the pitch angle calculated on the basis of the virtual value $hfk$, so that the headlamps are shifted into "upward glance" condition thereby to dazzle the oncoming and preceding vehicles. According to the fifth embodiment, since the vehicle height at the front wheel position under the large frictional resistance is raised in proportion to the road coefficient of friction, the virtual height $hfk$ at the front wheel position $Pf$ is corrected to the higher side by a predetermined value $b$ corresponding to the road coefficient of friction and sequentially, the pitch angle θ is calculated.

Figure 14:
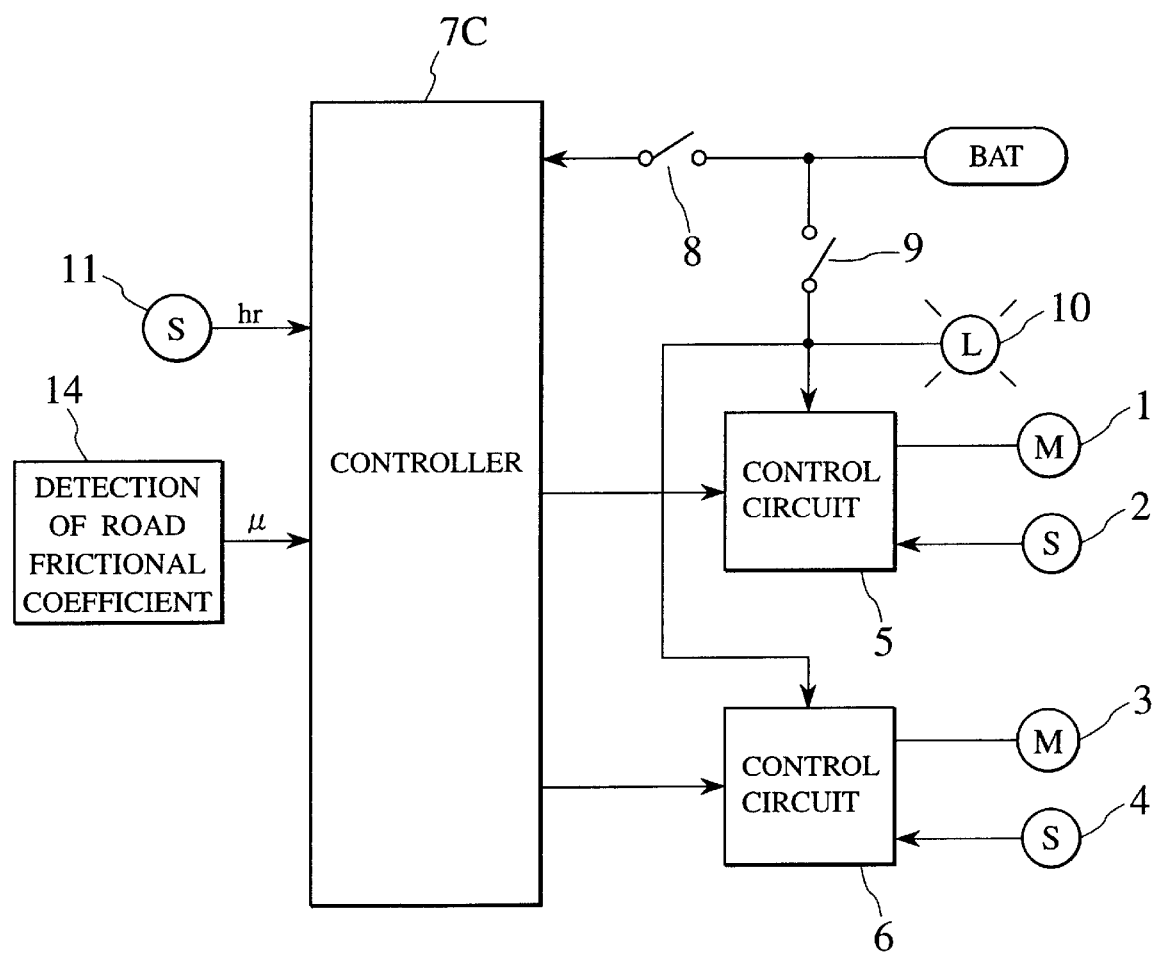
FIG. 14 is a diagram showing a constitution of a pitch angle calculating device in accordance with a fifth embodiment of the present invention.

FIG. 14 shows the constitution of the device in accordance with the fifth embodiment. Note, elements similar to those shown in FIG. 1 are indicated by the same reference numerals respectively and therefore, their descriptions are eliminated.

A road frictional coefficient detecting unit 14 detects a road coefficient μ in friction. The method of detecting the coefficient is as follows. Note, a rotational change of the wheel is proportional to a change in driving force of the vehicle and inversely proportional to the coefficient in friction. Therefore, it is carried out to obtain a transfer function from the change in driving force to the rotational change of the wheel thereby to lead an expression for calculating the coefficient of friction. For example, it is executed to calculate the coefficient of friction from both changes in throttle opening and wheel rotating speed, by using a Karman filter. Alternatively, the road condition, namely, the road coefficient of friction may be estimated by irradiating the light on the road and sequentially observing the reflection light. That is, there is a difference in polarization of the reflection light between the wet road and the dry road. Since a wet or frozen road exhibits the mirror reflection, the polarization component of the reflection light in the horizontal direction is almost zero. This characteristic allows a road condition to be recognized as slip-ease (slippery) condition. When irradiating the lights having a plurality of wavelengths and sequentially analyzing the reflected waves, there can be obtained a pattern where the reflection ratios differ from each other for every wavelengths. This characteristic allows the road condition to be judged.

A controller 7C serves to correct the virtual height value hfk at the front wheel position Pf, by the correction value b corresponding to the road coefficient $\mu$ in friction and sequentially calculate the pitch angle $\theta$ on the basis of the corrected virtual value hfk and the vehicle height hr at the rear wheel position Pr, by the following expression (15) or (16).

$$\theta = \tan^{-1} \frac{(hfk - \beta) - hr}{w} \quad (15)$$

$$\theta = \tan^{-1} \frac{(hfk + \alpha - b) - hr}{w} \quad (16)$$

Figure 15:
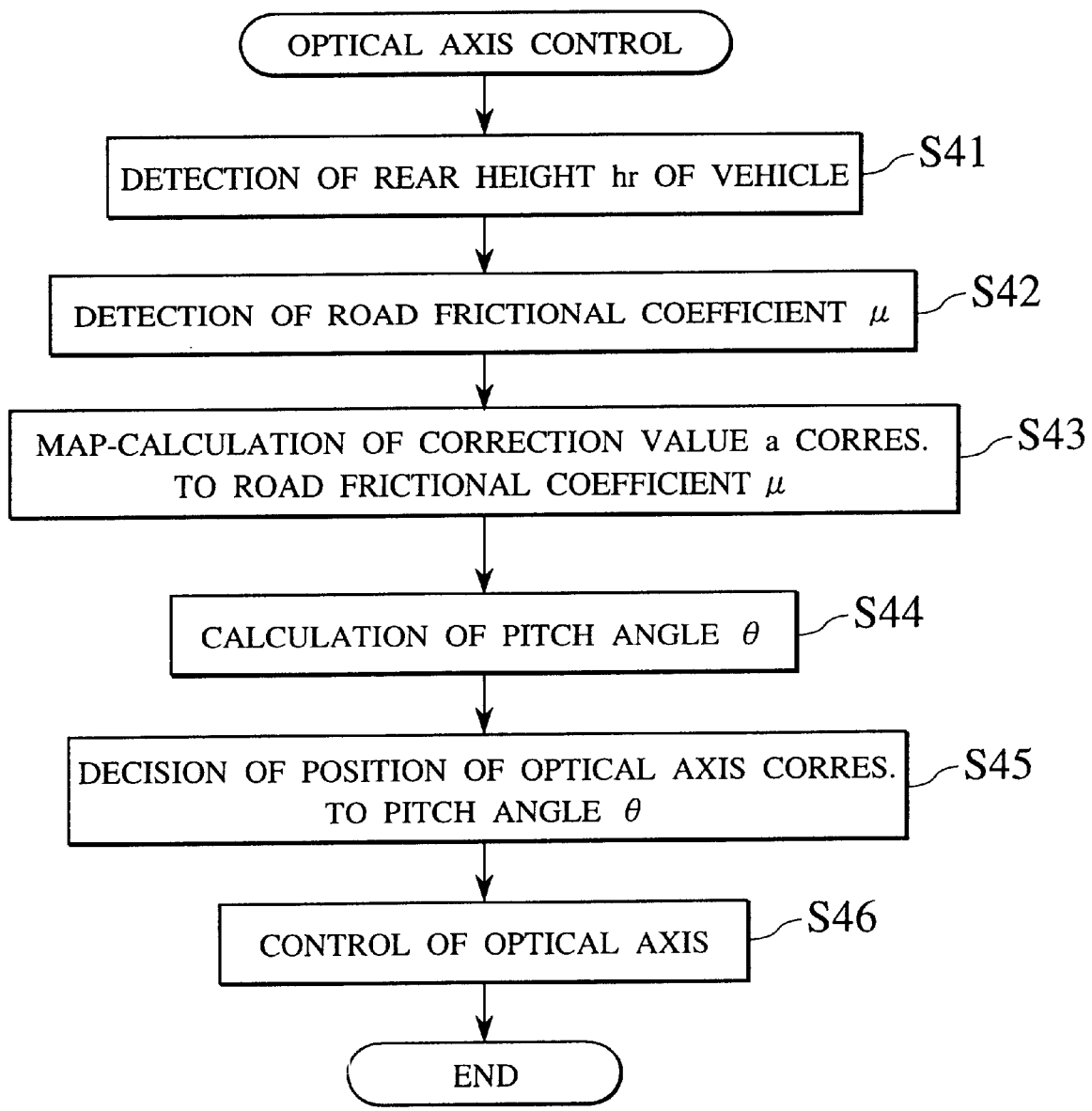
FIG. 15 is a flow chart showing an optical axis control program in accordance with the fifth embodiment.

FIG. 15 is a flow chart showing the optical axis control of the fifth embodiment. With reference to this flow chart, we now describe an operation of the device in accordance with the fifth embodiment.

At step S41, it is executed to detect the vehicle height hr at the rear wheel position Pr by the vehicle height sensor 11. Next, at step S42, it is further executed to detect the road coefficient $\mu$ in friction by the frictional coefficient detecting unit 14. At step S43, it is executed to calculate the correction value b corresponding to the road coefficient $\mu$, on the map of corrected values b. The map of correction values b can be provided by previously measuring increments of the vehicle height at the front wheel position Bf relative to the road coefficient $\mu$ and sequentially storing them as the correction values b. At step S44, the pitch angle $\theta$ is calculated by the above expression (15) or (16). At next step S45, it is executed to determine the position of the optical axes corresponding to the calculated pitch angle $\theta$. At step S46, the optical axes of the headlamps are controlled by the control circuits 5, 6.

MODIFICATION OF THE 5TH. EMBODIMENT OF THE INVENTION

As mentioned above, the fifth embodiment is related to the method of detecting the road coefficient it in friction and sequentially correcting the virtual height hfk at the front wheel position Pf by the correction value b corresponding to the road coefficient $\mu$ in friction. In the modification of the fifth embodiment, on condition that the amount of rainfall is estimated by a wiper switch, a raindrop sensor etc., the virtual height hfk at the front wheel position Pf may be corrected by the correction value b corresponding to the amount of rainfall. Alternatively, providing that the rainfall state is detected, the virtual height hfk at the front wheel position Pf may be corrected to the higher side by a predetermined value b' corresponding to the amount of rainfall. Since the road coefficient $\mu$ in friction is increased under the rainfall condition thereby to raise the front side of the vehicle, the correction of the virtual value hfk during the rainfall allows the lift-up amount at the front side of the vehicle to be compensated, whereby it is possible to calculate the accurate pitch angle $\theta$.

Note, in common with the fifth embodiment and the aforementioned modification, the height sensors 11 may be provided on left and right sides of the vehicle to obtain the average of the left and right heights, as similar to the first embodiment. According to this modification, it is possible to obtain the accurate vehicle height at the rear wheel position, which is not influenced by the vehicle's rolling.

In the above-mentioned embodiments and the modifications, the vehicle height sensor 11, the vehicle speed sensor 12, the acceleration sensor 13 and the road frictional coefficient detecting unit 14 correspond to the height detecting unit, the vehicle speed detecting unit, the acceleration detecting unit and the road condition detecting unit, respectively.

The entire contents of Japanese Patent Applications No. 10-21000 (filed Feb. 2, 1998) and Japanese Patent Application No. 10-8973 (filed Jan. 20, 1998) are incorporated herein by reference.

Finally, it will be understood by those skilled in the art that the foregoing description relates to three preferred embodiments of the pitch angle calculating device, and that various changes and modifications may be made to the present invention without departing from the scope thereof. The scope of the invention is defined with reference to the following claims.

What is claimed is:

1. A pitch angle calculating device for a vehicle, comprising:
   a height detecting unit arranged in either one of a front position (Pf) of the vehicle and the rear position (Pr) separated from the front position (Pf) by a predetermined distance (w), detecting either one of a front vehicle height and a rear vehicle height; and
   a calculating section calculating a pitch angle of the vehicle on the basis of the detected vehicle height, the predetermined distance (w) and a designated virtual height established as the other vehicle height which is not detected by the height detecting unit,
   wherein the designated virtual height is corrected with both number and positions of passengers on the vehicle and both weight and position of loads on the vehicle in advance of calculating the pitch angle by the calculating section.

2. The pitch angle calculating device of claim 1, wherein the height detecting unit is provided on both right and left sides of the vehicle, whereby the calculating section calculates the pitch angle on the basis of an average of right and left vehicle heights detected by the height detecting unit, the designated virtual height and the predetermined distance (w).

3. A pitch angle calculating device of claim 1, wherein said height detecting unit is arranged in the rear position (Pr) of the vehicle, detecting a rear vehicle height (hr) of the vehicle, the rear position (Pr) being separated from the front position (Pf) of the vehicle by the predetermined distance (w), said calculating section calculating a pitch angle of the vehicle on the basis of the detected rear vehicle height (hr), the predetermined distance (w) and a designated virtual height (hfk) established as the front vehicle height (hf) which is not detected by the height detecting unit, said pitch angle calculating device further comprising a vehicle speed detecting unit detecting a vehicle speed of the vehicle, wherein the detecting virtual height (hfk) is corrected with the detected vehicle speed in advance of calculating the pitch angle by the calculating section.

4. The pitch angle calculating device of claim 3, wherein the height detecting unit is provided on both right and left sides of the vehicle, whereby the calculating section calculates the pitch angle on the basis of an average of right and left vehicle heights detected by the height detecting unit, the designated virtual height (hfk) and the predetermined distance (w).

5. The pitch angle calculating device of claim 3, wherein the designated virtual height (hfk) is identical to the front vehicle height obtained as a result of lowering a reference vehicle height by a predetermined height.

6. A pitch angle calculating device of claim 1, wherein said height detecting unit is arranged in the rear position (Pr) of the vehicle, detecting a rear vehicle height (hr) of the vehicle, the rear position (Pr) being separated from the front position (Pf) of the vehicle by the predetermined distance (w), said calculating section calculating a pitch angle of the vehicle on the basis of the detected rear vehicle height (hr), the predetermined distance (w) and a designated virtual height (hfk) established as the front vehicle height (hf) which is not detected by the height detecting unit, said pitch angle calculating device further comprising an acceleration detecting unit detecting an acceleration of the vehicle in forward and backward directions thereof, wherein the detecting virtual height (hfk) is corrected by the detected acceleration in advance of calculating the pitch angle by the calculating section.

7. The pitch angle calculating device of claim 6, wherein the height detecting unit is provided on both right and left sides of the vehicle, whereby the calculating section calculates the pitch angle on the basis of an average of right and left vehicle heights detected by the height detecting unit, the designated virtual height (hfk) and the predetermined distance (w).

8. The pitch angle calculating device of claim 6, further comprising a vehicle speed detecting unit detecting a vehicle speed of the vehicle, wherein the acceleration detecting unit detects the acceleration of the vehicle by differentiating the vehicle speed detected by the vehicle speed detecting unit.

9. A pitch angle calculating device of claim 1, wherein said height detecting unit is arranged in the rear position (Pr) of the vehicle, detecting a rear vehicle height (hr) of the vehicle, the rear position (Pr) being separated from the front position (Pf) of the vehicle by the predetermined distance (w), said calculating section calculating a pitch angle of the vehicle on the basis of the detected rear vehicle height (hr), the predetermined distance (w) and a designated virtual height (hfk) established as the front vehicle height (hf) which is not detected by the height detecting unit, said pitch angle calculating device further comprising a road condition detecting unit detecting a road condition of a road on which the vehicle travels, wherein the detected virtual height (hfk) is corrected by the detected road condition in advance of calculating the pitch angle by the calculating section.

10. The pitch angle calculating device of claim 9, wherein the height detecting unit is provided on both right and left sides of the vehicle, whereby the calculating section calculates the pitch angle on the basis of an average of right and left vehicle heights detected by the height detecting unit, the designated virtual height (hfk) and the predetermined distance (w).

11. The pitch angle calculating device of claim 9, wherein the road condition detecting unit detects a frictional coefficient of the road and the designated virtual height (hfk) is corrected with the detected frictional coefficient in advance of calculating the pitch angle by the calculating section.

12. The pitch angle calculating device of claim 9, wherein the road condition detecting unit detects an intensity of rain-drops and the designated virtual height (hfk) is corrected corresponding to the road condition in a rainfall in advance of calculating the pitch angle by the calculating section.

13. The pitch angle calculating device of claim 9, wherein the road condition detecting unit detects a working condition of a wiper and the designated virtual height (hfk) is corrected corresponding to the road condition in a rainfall in advance of calculating the pitch angle by the calculating section.

14. The pitch angle calculating device of claim 9, wherein the designated virtual height (hfk) is identical to the front vehicle height obtained as a result of lowering a reference vehicle height by a predetermined height.

15. A pitch angle calculating device of claim 1, wherein said height detecting unit is arranged in the rear position (Pr) of the vehicle separated from the front position (Pf) of the vehicle by the predetermined distance (w), for detecting a rear vehicle height, said calculating section calculating a pitch angle of the vehicle on the basis of the detected rear vehicle height, the predetermined distance (w) and a designated virtual height (hfk) established as a front vehicle height which is not detected by the height detecting unit, the designated virtual height (hfk) being identical to the front vehicle height obtained as a result of lowering a reference vehicle height by a predetermined height.

* * * * *